United States Patent
Khanfouci (10) Patent No.: US 12,155,540 B2
(45) Date of Patent: Nov. 26, 2024

(54) METHOD FOR PROVIDING MULTI-SITE ORCHESTRATION IN PUBLIC NETWORK FOR FACTORY AUTOMATION, ORCHESTRATOR, AND COMMUNICATION SYSTEM

(71) Applicant: MITSUBISHI ELECTRIC CORPORATION, Tokyo (JP)

(72) Inventor: Mourad Khanfouci, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 70 days.

(21) Appl. No.: 17/909,633

(22) PCT Filed: Feb. 4, 2021

(86) PCT No.: PCT/JP2021/005133
§ 371 (c)(1),
(2) Date: Sep. 6, 2022

(87) PCT Pub. No.: WO2021/199708
PCT Pub. Date: Oct. 7, 2021

(65) Prior Publication Data
US 2023/0131226 A1 Apr. 27, 2023

(30) Foreign Application Priority Data
Apr. 3, 2020 (EP) .................................... 20315104

(51) Int. Cl.
*H04L 41/5009* (2022.01)
*H04L 41/14* (2022.01)
(Continued)

(52) U.S. Cl.
CPC ........ *H04L 41/5009* (2013.01); *H04L 41/145* (2013.01); *H04L 41/342* (2022.05); *H04L 41/5019* (2013.01)

(58) Field of Classification Search
CPC . H04L 41/5009; H04L 41/145; H04L 41/342; H04L 41/5019
(Continued)

(56) References Cited

U.S. PATENT DOCUMENTS 11,012,872 B1 * 5/2021 Bellamkonda ...... H04L 41/0823
2018/0374051 A1 * 12/2018 Li ..................... G06Q 10/0633
(Continued)

OTHER PUBLICATIONS

Korean Office Action for Korean Application No. 10-2022-7032703, dated Nov. 29, 2023, with an English translation.
(Continued)

*Primary Examiner* — Lan Dai T Truong
(74) *Attorney, Agent, or Firm* — Birch, Stewart, Kolasch & Birch, LLP (57) ABSTRACT

Examples include a method for providing multi-site orchestration in a public network for factory automation. The public network provides communication and computing functionality to a plurality of sites which are configured to communicate with each other by means of slice of the public network. The method includes building a multi-site orchestration model based on initial performance of communication between different sites; determining choreography opportunities between the different sites by using the multi-site orchestration model; triggering choreography between the different sites; and evaluating performance of the choreography between the different sites and updating the multi-site orchestration model.

15 Claims, 3 Drawing Sheets

(51) Int. Cl.
    *H04L 41/342* (2022.01)
    *H04L 41/5019* (2022.01)
(58) Field of Classification Search
    USPC .......................................................... 709/224
    See application file for complete search history.

(56) References Cited

U.S. PATENT DOCUMENTS

| | | | | |
|---|---|---|---|---|
| 2019/0028329 | A1* | 1/2019 | Kanakarajan | ........... H04L 45/22 |
| 2019/0121801 | A1* | 4/2019 | Jethwa | .................. G06F 16/243 |
| 2019/0342354 | A1* | 11/2019 | Bosch | ..................... H04L 65/80 |
| 2020/0183737 | A1* | 6/2020 | Bruun | .................... G06F 9/4881 |
| 2021/0144517 | A1* | 5/2021 | Guim Bernat | ...... H04L 41/0869 |
| 2023/0084761 | A1* | 3/2023 | Koopman, Jr. | ..... G06F 18/2178 |
| | | | | 706/12 |

OTHER PUBLICATIONS

International Search Report (PCT/ISA/210) issued in PCT/JP2021/005133, dated May 14, 2021.

Saraiva De Sousa et al., "Network Service Orchestration: A Survey," IEEE Communications Surveys & Tutorials, Arxiv.org, Cornell University Library, Mar. 23, 2018, total 30 pages.

Sciancalepore et al., "A Future-Proof Architecture for Management and Orchestration of Multi-Domain NextGen Networks," IEEE Access, vol. 7, Jul. 1, 2019, pp. 79216-79232.

Velasquez et al., "Service Orchestration in Fog Environments," 2017 IEEE 5th International Conference on Future Internet of Things and Cloud (FICLOUD), IEEE, Aug. 21, 2017, pp. 329-336.

Walia et al., "5G network slicing strategies for a smart factory," Computers in Industry, Elsevier, vol. 111, Aug. 6, 2019, pp. 108-120.

Written Opinion of the International Searching Authority (PCT/ISA/237) issued in PCT/JP2021/005133, dated May 14, 2021.

Chinese Office Action and Search Report for Chinese Application No. 202180024359.0, dated May 18, 2023, with English translation.

Saraiva de Sousa et al., "Network Service Orchestration: A survey", Computer Communications, Elsevier, vol. 142-143, 2019 (Available online May 11, 2019), pp. 69-94.

Japanese Notice for Reasons for Refusal for Japanese Application No. 2022-561260, dated Apr. 11, 2023, with English translation.

Saraiva de Sousa et al., "Network Service Orchestration: A Survey", Department of Computer Engineering and Industrial Automation, School of Electrical and Computer Engineering, May 20, 2019, pp. 1-33.

* cited by examiner

METHOD FOR PROVIDING MULTI-SITE ORCHESTRATION IN PUBLIC NETWORK FOR FACTORY AUTOMATION, ORCHESTRATOR, AND COMMUNICATION SYSTEM

TECHNICAL FIELD

The present invention relates to network orchestration for multi-site orchestration for factory automation, especially to method for providing multi-site orchestration in a public network for factory automation.

BACKGROUND ART

Resources provisioning for the communication between multiple sites of a factory or disseminated between different factories is adapted for the factory automation. Usually, the resources provisioning is obtained from a public operator, such as Public Land Mobile Network (PLMN), through the deployment of a dedicated low cost network slice for factory automation communications.

In the art, the multi-site orchestration is used to establish/release communications in this network slice. This establishment and release of communications is based on slice usage in terms of bandwidth and computational resources usage metrics that are obtained from the PLMN.

In particular, a general resource provisioning problem has been presented as a solution of three coordinated optimization problems. These optimization problems are coordinated by the resources usage indication (routing/computation resources) that are defined as slice costs. Detailed problems are defined in the following:

A. The slice owner optimization problem: where the slice throughput demand (in bandwidth) is obtained through utility maximization optimization problem that uses the slice routing and congestion costs and computation usage costs as parameters. The same utility function is used for the different sites.

B. The cloud owner optimization problem: where the computation resources that are needed to support the virtual functions (VNF) that are required for the communication between the sites and the path between the different VNF as well as the cloud usage costs is provided by the cloud owner. These resources are proportional to PLMN slice bandwidth. This problem outputs the slice computation costs to the slice owner optimization problem and uses the routing and congestion costs as inputs.

C. The network owner optimization problem: where the routing and the slice costs are found by the network owner in order to route different flows for the communication between the sites in the slice. This network owner optimization problem obtains the slice congestion costs to inform the slice owner and cloud provider of the capabilities of the network.

The slice routing and congestion costs are provided by the solution of the optimization problem (C) represent the possibility of the network to achieve the slice owner demand requirements setup by the problem (A), the cloud owner optimization requirements that are obtained by solving the problem (B). The costs are high if the requirements are not achieved and the costs are low otherwise. The general view of multisite allocation in the state of the art as a solution to slice resource allocation problem is summarized in FIG. 1 illustrating a multi-site orchestration architecture in the art.

Figure 1:
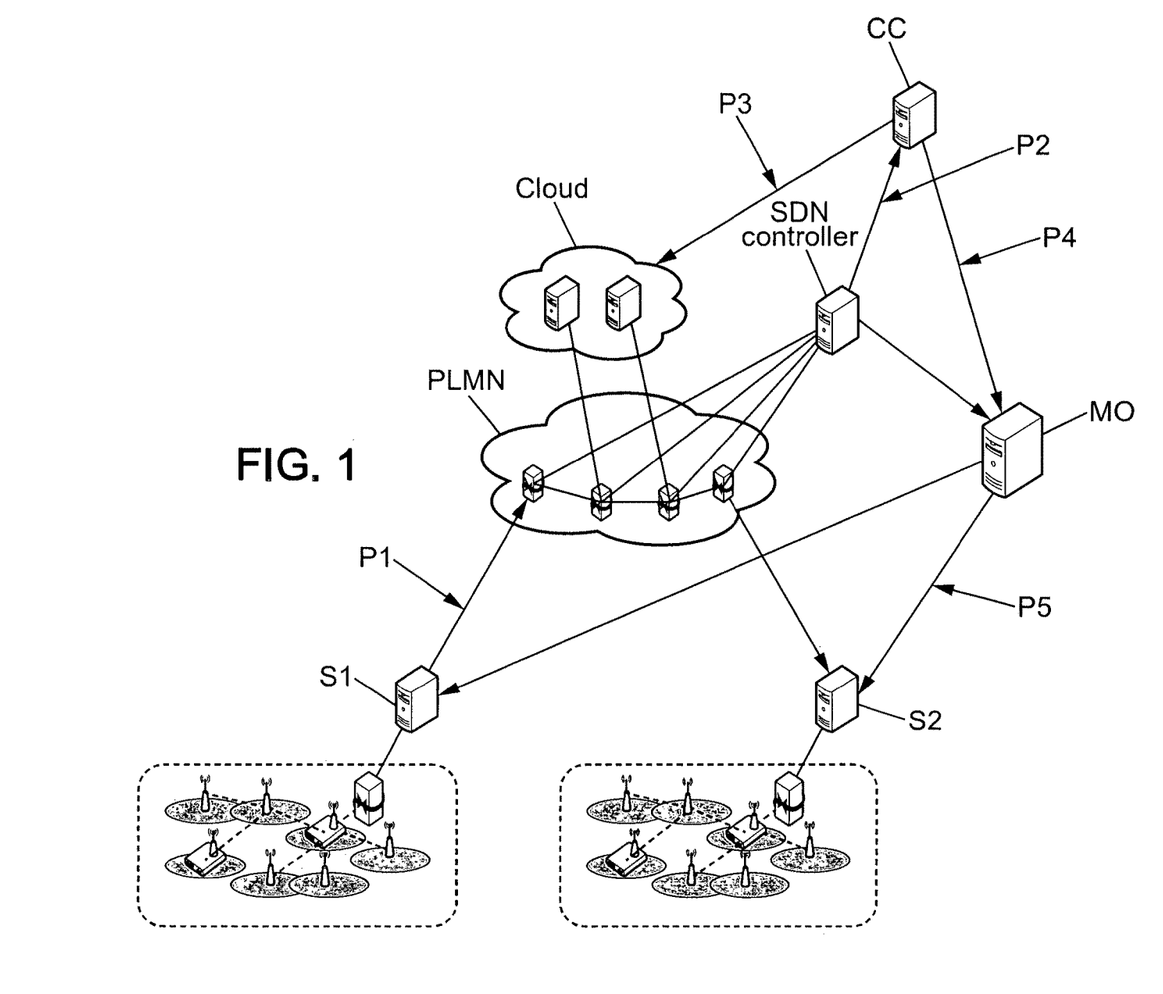
FIG. 1 illustrates a multi-site orchestration architecture in the art.

In the context shown in FIG. 1, two sites, S1 and S2, from a company want to communicate using a slice i of the public network PLMN, noted as P1 in FIG. 1. The steps of this communication establishment are the following:

1) The multi-site orchestrator MO transmits to the software defined network (SDN) controller, the bandwidth demand of the communication between sites S1 and S2. The demand is both in terms of throughput and latency.

2) The SDN controller solves the slice routing problem for the communication between the sites S1 and S2 and transmits routing decisions and slice costs to the cloud controller CC and to the multi-site orchestrator MO, noted as P2 in FIG. 1. The slice costs transmitted by the SDN controller are essentially related to the achievement of the throughput demand of the slice.

3) The cloud controller CC provision computation resources based on the routing decisions of the SDN controller by the means of allocating virtual functions for the slice in order to ensure the latency requirements of the slice, noted as P3 in FIG. 1. The cloud controller CC transmits the computation cost of the slice, i.e. to what extent the latency requirement of the slice is fulfilled, noted as P4 in FIG. 1.

4) The multi-site orchestrator MO receives the routing decisions and costs (routing and computation costs) and adjusts the slice demands to adapt the best to the current situation in the network, noted as P5 in FIG. 1.

Therefore, in the state of the art, virtual paths establishment and slice resource provisioning are presented and applied for communication between the sites, i.e. the problem is viewed as a periodic and reconfigurable slices design for the multi-site operation based on the slice provided by the PLMN.

However, one drawback of the above-mentioned approach is the latency of the orchestration, since the multisite orchestrator receives information from the sites and determines the transmission policy between the different sites. In addition, back and forth signaling between the sites and the multisite orchestrator will also introduce signaling overhead in the network.

Moreover, another drawback is that the multi-site orchestrator complexity in the art is high, since the orchestrator in the art should also decide the transmission strategy and the demand in terms of throughput and computation of the sites.

The invention aims to improve these drawbacks.

SUMMARY OF INVENTION

In this regard, according to one aspect of the invention, it is provided a method for providing multi-site orchestration in a public network for factory automation, wherein the public network provides communication and computing functionality to a plurality sites which are configured to communicate with each other by the means of network slice of the public network, the method comprising:
building a multi-site orchestration model based on initial performance of the communication between different sites;
determining choreography opportunities between the different sites by using the multi-site orchestration model;
triggering choreography between the different sites; and
evaluating the performance of the choreography between the different sites and updating the multi-site orchestration model.

With such an arrangement, the present invention may combine the centralized orchestration with distributed orchestration that relies on the distributed provisioning of the edge cloud resources through the multi-site orchestrator a model of the network that is maintained in the multi-site orchestrator, so as to minimize the latency of the orchestration process.

In an embodiment, before building the multi-site orchestration model, the method according to the present invention further comprises: initiating an initial orchestration so as to identify a coarse initial model, based on which the multi-site orchestration model is built.

Furthermore, the initial orchestration is a proportional faire orchestration, with which each site communicates with its neighboring sites with the same data packet bandwidth.

Moreover, the multi-site orchestration model contains a representation or abstraction of sites and of the communication conditions between the sites.

Alternatively, the multi-site orchestration model includes a graph which contains nodes representing the sites and edges between pair of nodes representing communication or processing capabilities between the nodes.

Alternatively, the multi-site orchestration model includes a model for the demand of the sites, for example, expressed in terms of utility of the communication between the sites.

Alternatively, the multi-site orchestration model includes a model for the congestion of the communication between the sites, for example, expressed in terms of congestion costs.

Alternatively, wherein the multi-site orchestration model includes a site ranking that is based on specific flow transmission that is based on a random walk of packets between the sites and a stochastic matrix.

Alternatively, the multi-site orchestration model includes a database of sites adapted to perform orchestration with relevant attributes.

Alternatively, the initial performance of the public network is obtained by periodic monitoring of network state, throughput, packet errors, and/or delay. In addition, the step of determining choreography opportunities between different sites by using the multi-site orchestration model is processed based on error between predicted performance from the multi-site orchestration model and the measured traffic performance or through topological criteria that are obtained from the multi-site orchestration model.

In this regard, in the present invention, a flexible model based multi-site orchestration with reduced latency triggers orchestration in some conditions determined from the network monitoring. Local orchestration is determined when needed in order to minimize the latency and optimize the QoS of the orchestration. These local choreographies are used to enrich the model used for multi-site orchestration.

In yet another embodiment, the step of triggering choreography between the different sites comprises setting up an edge cloud between the different sites participating to the choreography and starting to exchange information between the different sites.

In yet another embodiment, during the step of evaluating the performance of the choreography between the different sites and updating the multi-site orchestration model comprises monitoring the public network.

The abovementioned alternative features can be combined with each other, unless they are not compatible.

According to another aspect of the invention, it is further provided an orchestrator for providing multi-site orchestration in a public network for factory automation, wherein the public network contains a plurality sites which are configured to communicate with each other by slice of the public network, being configured to:

build a multi-site orchestration model based on initial performance of the public network;

determine choreography opportunities between different sites by using the multi-site orchestration model;

trigger choreography between the different sites; and evaluate the performance of the choreography between the different sites and update the multi-site orchestration model.

According to yet another aspect of the invention, it is further provided a communication system for factory automation, comprising the above mentioned orchestrator.

In this regard, the present invention proposes a cognitive model based multi-site orchestration where the multi-site orchestrator maintains a model of the orchestration process between the different sites of the factory based on the received throughputs, latency, packet error rates or other various network radio metrics. These metrics are obtained through a continuous monitoring of the communication through the slice provided by the network. In other words, in the present invention, the multi-site orchestrator determines orchestration opportunities and local orchestration (choreography) opportunities and trigger in order to minimize the latency and improve the QoS of the system. The choreography step enrich the multi-site orchestration model.

Therefore, compared with standard model based orchestration in the art, the present invention provides more flexibility, since it can start with a coarse model and adjust the model in order to improve the orchestration performance and reduce its overall signaling and complexity.

BRIEF DESCRIPTION OF DRAWINGS

Other features and advantages of the present invention will appear in the description hereinafter, in reference to the appended drawings, where.

DESCRIPTION OF EMBODIMENTS

Figure 2:
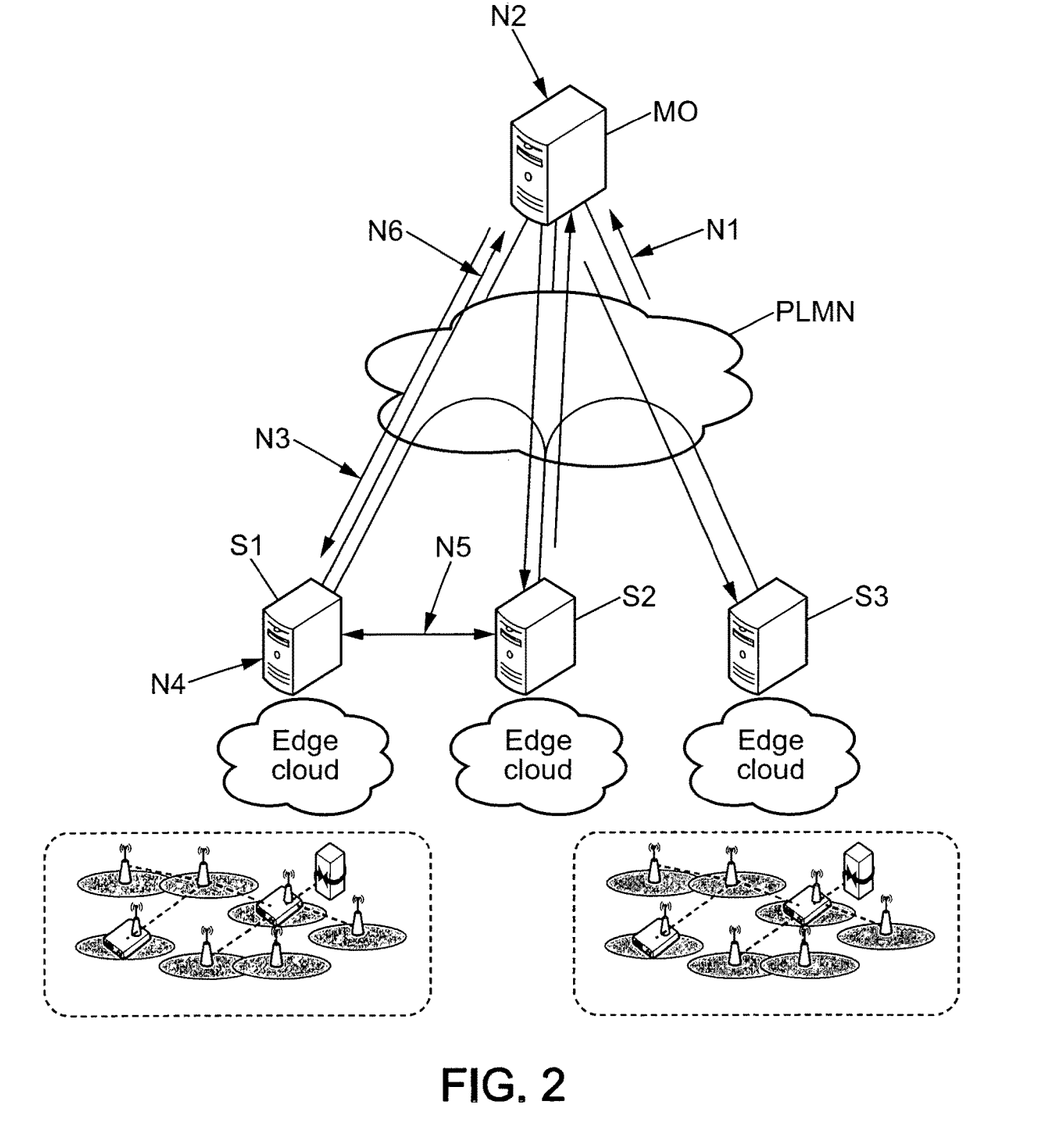
FIG. 2 illustrates a multi-site orchestration architecture according to the present invention.

FIG. 2 shows a multi-site orchestration architecture according to the present invention. In the scenario of FIG. 2, a multi-site orchestrator MO is adjusting the communication bandwidth between different sites S1, S2, and S3 (for example between sites S1 and S2) in a network slice provided by a SDN controller of a given PLMN network and relying on the computation resources that are deployed closely to each site through an edge cloud or a multi-access edge communication platform.

Each site of the multi-site orchestrator domain defines a local utility function $U_i$ that represents the gain it will have from requesting from the network the throughput $r_i$ over the slice the network is providing.

The utility function is adjusted based on the slice congestion cost $\lambda_i$ such that the throughput requested for the site i is adjusted based on the overall gain (variation of the gain with respect to the throughput variation minus the throughput cost).

The multi-site orchestrator MO has the objective to maximize the overall gain of the system, i.e. the sum of the utilities in the network by balancing the bandwidth between the different sites without the indication of each site to site congestion cost but rather the indication combined congestion costs for the different sites.

In this regard, the multi-site orchestrator MO decides based on a model of the network of the bandwidth balancing between the different sites, wherein the model will detailed hereinafter. The present invention intends to perform the bandwidth balancing iteratively by starting with proportional fair bandwidth balancing, and identify from this step the relevant model parameters for the orchestration, wherein a subset of the model parameters need to be updated through local orchestration and trigger the local orchestration (choreography) for the models parameters identification.

Therefore, in general, the present invention proposes a solution including the following features:

The multi-site orchestrator builds a model for the orchestration between the sites. In particular, the multi-site orchestrator MO evaluates the model by monitoring different KPIs of the public network and/or the cloud for the orchestration. In addition, the multi-site orchestration determines opportunities for service choreography based on the KPIs of the PLMN. The opportunity for orchestration is for example a sufficient radio and/or service level KPIs in order to perform local distributed orchestration between sites, i.e. service choreography.

The performance of the model based orchestration is evaluated by the means of monitoring of the orchestration performance in order to identify the subset of the model parameters to be updated. The monitoring of the network consists of tracking KPIs that maybe:

Service related KPIs such as the fulfilment of the orchestration service level requirements or the SLA service level agreement, are used for the evaluation of the orchestration performance.

Radio level or transport level KPIs are used for the performance evaluation of the orchestration such as packet error rate performance, end to end latency, jitter performance, . . . etc.

The multi-site orchestrator triggers service choreography between the sites when the performance of the orchestration is low or when an opportunity for service choreography is detected. The orchestrator triggers distributed orchestration between the sites by exchanging information, signalling and by provisioning computational resources through containers. The service choreography is performed between the sites and is used to improve the orchestration model.

Figure 3:
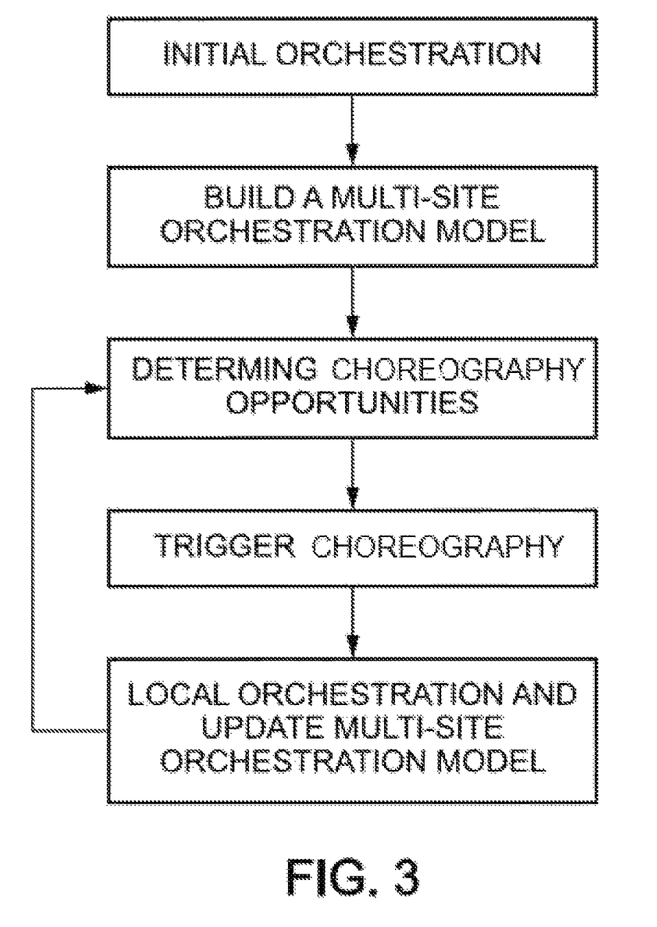
FIG. 3 is a flowchart of an illustrative method according to the invention.

Detailed steps according to the method of the present invention are now described by referring to FIG. 3, which is a flowchart of an illustrative method according to the invention.

As shown in FIG. 3, an exemplary embodiment of the method according to the present invention comprises the following steps:

Step 0: Initial Orchestration Step

Prior to model building step, the multi-site orchestrator may start with an optional initial orchestration step, so as to identify a coarse initial model for the multi-site orchestrator.

The initial orchestration may be given by proportional fair orchestration where the multi-site orchestrator knows the capacity C bits/second of the slice provided by the PLMN and triggers each of the N sites of the network to communicate by transmitting data packets with bandwidth r=C/N. Each site communicates with its neighbouring sites with the same data packet bandwidth.

Step 1: Building a Multi-Site Orchestration Model

Based on the initial orchestration step, a representation or a model of the sites and of the communication conditions between the different sites is built in the multi-site orchestrator in this step.

This representation may include:

A graph (directed or undirected) where the nodes of the graph represent the sites of the factory and the edges between any pair of nodes represent the communication/processing capabilities between the nodes. The communication/processing capabilities between the sites S1 and S2 can be defined, for example, in terms of:

The packets throughput of the communication $r_{1,2}$ expressed as the number of packets transmitted per time unit.

The bit throughput of the communication $b_{1,2}$ expressed as the number of bits transmitted per time unit.

The latency of the communication $t_{1,2}$ expressed in seconds per communication a number of N packets.

Processing capabilities $p_{1,2}$ that represents the amount of computation resources available in the path between the nodes S1 and S2. We take the assumption that the processing capabilities are related to the throughput capabilities as $p_{1,2}=\omega r_{1,2}$ where $\omega$ is the amount of processing needed to process a packet of data.

A model for the demand of the sites expressed in terms of differential utility function. For example, the utility of the communication between the site S1 and the site S2 is expressed as $U_{1,2}=U_1(r_{1,2})-U_2(r_{1,2})$ where the function $U_1$ represents the gain for transmitting the throughput $r_{1,2}$ to the node 2 and the function $U_2$ represent the gain from receiving the throughput $r_{1,2}$ from the site S2. Both gains are depending on the service between S1 and S2.

The utility function may be the same function for the sites or a function that varies from one site to another. The utility function may be alpha fair utility function that is parameterized by the parameter $\alpha$ as the following:

$$U(r) = -\frac{r^{(1-\alpha)}}{(1-\alpha)}$$

if $\alpha>1$ and $U(r)=\log(r)$ for $\alpha=0$, wherein r is the ongoing packet throughput from the node.

A model for the congestion of the communication between the different sites. The model is expressed as congestion costs A that may be as a function of the packet error rate (PER) of the transmission between the sites and/or the packet throughput between the nodes. If the PER is high, the congestion cost is high and if the PER is low, the congestion cost is low. If the throughput is low, the congestion cost is high and if the throughput is high, the congestion cost is low. The congestion cost may also include the latency of the transmission that models the packets lost during the transmission between the different sites.

A communication between the different sites is modelled as a random walk and a stochastic matrix S is defined. The matrix element $S_{1,2}$ is expressed as the proportion of the ongoing traffic from the node 1, i.e. $S_{1,2}=1/d(1)$ where d(1) is the number of the nodes with which the node 1 is able to communicate. It is here assumed that the site S1 is communicating with the site S2 with probability $S_{1,2}$.

From the random walk matrix, a transition matrix G that is parameterized by two parameters β,n where the parameter $\beta \in [0, 1]$ describes the correlation between the current multisite communication and a multisite communication described as pure random walk between the sites. The parameter n controls the communication attempts to sites not included in the walk from the node 1. The element $G_{1,2}$ is given by the following $G_{1,2}=\beta S_{1,2}+(1-\beta)(1/n)$.

A database of sites which are able to perform orchestration with the relevant attributes. In the case, the site S1 determines locally from the received traffic, the relevant parameters of the communication with its neighboring sites as well as the processing capabilities of the neighboring sites and register to the database with the determined attributes. This database will be used by the multi-site orchestrator MO to perform orchestration through the provisioning of resources for the communications between the different sites. This orchestration is based on the attributes of the registered sites in the database. Web based representational state transfer REST framework for application interface (API) signaling optimization may be used to reduce the signaling overhead between the sites and the multi-site orchestrator.

The refreshment of the data base is performed by local orchestration between the different sites.

The above mentioned models can be applied alone or in combination. The multi-site orchestration model is therefore built, noted as N2 in FIG. 2, at the multi-site orchestrator MO from the periodic monitoring of the network state, throughput, packet errors, delay, . . . , etc., noted as N1 in FIG. 2, and is used for the multi-site orchestration MO in order to reduce the signalling between the network and the different sites. In addition, reliability of the model may be evaluated locally at the multi-site orchestrator MO by checking the error between the predicted communication profile between the sites and the actual measured performance during network monitoring periods.

Step 2: Determine Choreography Opportunities

Accordingly, the multi-site orchestrator determines the opportunities for choreography based on the error between predicted performance from the model (such as predicted throughput of the communication between the sites S1 and S2) and the measured traffic performance during the network monitoring periods or through topological criteria that are obtained from specific properties of the multi-site orchestration model or through a combination between error based triggering and topological based triggering.

The error is, for example, collected into an error matrix that is obtained as a function of the throughput errors PER and delay estimation errors, and various other network performance indicators that are monitored during the choreography.

In particular, the choreography opportunities may be defined when the following is achieved:

The choreography is triggered for sites S1 and S2, if the error $e_{1,2}$ is above an error threshold that is preconfigured in the multi-site orchestrator MO.

The choreography is triggered for sites S1 and S2, if the total error for the sites is above a threshold and at least one of the performance indicators (throughput, latency, packet error rates) are below a threshold.

Alternatively, the choreography may be triggered between the sites S1 and S2 when the following topology criteria are realized:

The choreography is triggered for sites S1 and S2, if the sites S1 and S2 are having high degrees in the graph; the degree of a node S1 of the graph is defined as the number of neighboring sites with which the site S1 is able to communicate. High degree nodes in the graph are nodes with degree above a threshold.

The choreography is triggered for sites S1 and S2, if the sites S1 and S2 are contributing to a high number of communication paths between any two sites in the network; In this case, the choreography between the sites S1 and S2 is triggered if the nodes S1 and S2 are having high centrality in the network. The high centrality is defined as a centrality above a threshold.

The nodes are ranked with respect to the transition matrix G and the choreography is triggered for sites S1 and S2, if the ranks of the sites S1 and S2 are below a threshold; The ranking considered in this option is for example, the eigenvalue of the matrix G corresponding to the node or the eigen-vector corresponding to some specific eigenvalue of the matrix G.

The choreography is triggered for sites S1 and S2, if the sites S1 and S2 are contributing to a routing tree from another site in the multi-site deployment and their relative congestion cost $\lambda_{1,2}$ increased. The relative congestion $\lambda_{1,2}$ cost is defined as the routing cost for the communication between the sites S1 and S2.

Step 3: Trigger Multi-Site Choreography

Afterwards, the multi-site choreography, noted as N4 in FIG. 2, may be triggered by the multi-site orchestrator MO through the following signaling:

The sites S1 and S2 perform choreography, when the sites receive an explicit control message for triggering the multi-site choreography from the orchestrator. This message may include the IP addresses of the sites that are contributing to the choreography and the QoS parameters of the virtual network that is used for the communication between the sites in the choreography step;

The transition matrix G is updated by reducing the parameter $\beta$ and the ranking is updated for the network at the orchestrator, the ranks are transmitted to the sites S1 and S2, noted N3 in FIG. 2. The sites decide to perform choreography if their rank is below a threshold. The choreography is performed between the sites with similar lower ranks;

The utility function of the sites S1 and S2 is updated by the orchestrator at each site so that the choreography is performed as the following. The parameter $\alpha$ of the utility functions is reduced and the throughput of the communication between the different sites is set to $$r_{1,2}=(\lambda_{1,2})^{-\frac{1}{\alpha}}$$

where $\lambda_{1,2}$ is the last estimation of the congestion cost for the communication between the sites S1 and S2.

Step 4: Local Orchestration (Multi-Site Choreography) and Update Multi-Site Orchestration Model The orchestrator MO setups edge clouds in the different sites participating to the local orchestration and a virtual network for the communication between the different edge clouds. The edge clouds are coordinated through edge cloud container based technology. The sites that are participating to local orchestration start to exchange information at a throughput defined as following:

The parameter α of the utility of the sites is reduced and the throughput of the communication between the different sites is set to $$r_{1,2} = (\lambda_{1,2})^{-\frac{1}{\alpha}}$$

where $\lambda_{1,2}$ is the last estimation of the congestion cost for the communication between the sites S1 and s2;

The parameter α of the utility of the sites is reduced and the throughput of the communication between the different sites is set to $$r_{1,2} = (\lambda_{1,2})^{-\frac{1}{\alpha}}$$

where $\lambda_{1,2}$ is the last estimation of the congestion cost for the communication between the sites 1 and 2, if the reliability of the congestion cost $\lambda_{1,2}$ is low.

The throughput is reduced from its current value into a degraded throughput value that is provided by the MNO or selected autonomously by the sites S1 and S2.

In the meantime, the multi-site orchestrator MO is monitoring the performance of the communication between the two sites, noted as N5 in FIG. 2. In particular, the multi-site orchestrator decides eventually during its monitoring period to adjust the local utilities of the sites and stores the last value of the utility functions. For example, in case the monitoring is based on the transition matrix G, the orchestrator updates the value of the matrix S with the new parameters as the number of neighbors with good throughput/latency performance $m_{1,2}$. In this case $S_{1,2}=m_{1,2}/d(1)$.

The model/database of the multi-site orchestrator is updated with the parameter learned during the local orchestration, noted as N6 in FIG. 2.

In order to further explain the present invention, hereinafter we will describe some embodiments using the method mentioned above.

Assuming a multi-site orchestration scenario of N sites, wherein each site optimizes its own utility function and the multi-site orchestration is the operation of the maximization of the sum of the utility functions of the sites. The sites are using the same network slice for the communication and the maximum throughput or bandwidth allocated to the network slice, i.e. slice capacity is C.

The utility function determines the throughput demand of each site, i.e. the bandwidth needed for communications and the bandwidth needed for processing for a given service. It is assumed that there is a proportionality relation between the bandwidth demand of the site and the processing capabilities of virtual functions in the site.

In this embodiment, the multi-site orchestration that we propose is based on strategies for the adjustment of the throughput for the communications between the different sites and adjustment of the demands in order to minimize the communication outage and optimize the bandwidth usage in the slice.

The utility functions are modelled as alpha fair utility functions that expresses the site demands in terms of the bandwidth needed for communication as the following function of the throughput of the site $r_i$ $$U_i(r_i) = \frac{r_i^{(1-\alpha_i)}}{(1-\alpha_i)}$$

The parameter alpha adjusts the demand with respect to the throughput and the overall multi-site orchestration problem is seen as network utility function maximization with multiple demand parameters.

The general multi-site orchestration problem is given as:

$$\max \sum_i \frac{r_i^{(1-\alpha_i)}}{(1-\alpha_i)}$$

$$\text{s.t.} \sum_{i=1}^{N}\sum_{j=1}^{N} A_{i,j} r_{i,j} \leq C$$

$$r_i = \sum_{j=1}^{N} r_{i,j}$$

The variables $A_{i,j}$ are the routing variables of the network, i.e. the contribution of the communication between the site i and j to the traffic over the network slice and $r_{i,j}$ is the throughput of the communication between the site i and the site j.

Including the congestion cost $\lambda$ for the network slice we have the following global Lagrangian formulation $$L = \sum_i \frac{\left(\sum_{j=1}^{N} r_{i,j}\right)^{(1-\alpha_i)}}{(1-\alpha_i)} - \lambda\left(\sum_{i=1}^{N}\sum_{j=1}^{N} A_{i,j} r_{i,j} - C\right).$$

Each local orchestrator is solving the following local Lagrangian problem $$\max L_i = \frac{\left(\sum_{j=1}^{N} r_{i,j}\right)^{(1-\alpha_i)}}{(1-\alpha_i)} - \lambda \sum_j A_{i,j} r_{i,j}.$$

The solution to this local Lagrangian problem is given as $$r = \left(\lambda \sum_j A_{i,j}\right)^{-\frac{1}{\alpha_i}}.$$

This means that each site adjusts its throughput by considering routing parameters $A_{i,j}$ and slice cost parameter $\lambda$. The invention proposes a simplified multi-site orchestration where dominant routing parameter is identified in each site as $$A_i^* = \exp(\max_j(\log(A_{i,j}))).$$

The site adjusts its throughput as:

$$r_i = (\lambda A_i^*)^{-\frac{1}{\alpha_i}}.$$

Assuming the sites are using the full capacity of the slice, each slice will transmit with the following throughput $$r_i^* = \left(C \frac{A_i^*}{\sum_i A_i^*}\right)^{-\frac{1}{\alpha_i}}.$$

The throughput between the site i and j is provided by the following relation $$r_{i,j} = \frac{1}{N}\left(C\frac{A_i^*}{\sum_i A_i^*}\right)^{-\frac{1}{\alpha_i}}.$$

According to the present invention, the dominant routing is estimated or determined from the model and adjusting the throughput with respect to the costs as described previously.

In this embodiment, an exemplary method according to the present invention contains the following steps:

1. The multi-site orchestrator initiates an orchestration with the parameter $\alpha_i=1$, i.e. training sequences and a schedule, which is the order in which the packets are sent from one site to the other sites of the multi-site deployment, is used to identify the orchestration model $\{A_{i,j}\}$. The dominant routing for each site is obtained from the measured throughputs of the communications between the different sites.

2. Congestion cost is obtained from the measured throughput for the different sites at the multisite orchestrator.

3. The multi-site orchestrator selects the set of sites with maximum routing value $A_i^*$ and sets the throughput of the sites to $r_i^*$. If the congestion cost is increased or some site are in outage, the multi-site triggers local orchestration to update the model between a specific pairs of nodes that are having the nodes with dominant routing $A_i^*$.

4. Local choreography updates the estimation of $\{A_{i,j}\}$ and go to step (2).

Alternatively, in another embodiment, the invention proposes to adjust the site demands in order to maximize the local lagrangian relation described previously. The demands are described by the parameter, described by the parameter $\alpha_i$ iteratively by the means of the following relation where k is defining the iteration index:

$$\alpha_i^k = 1 + \frac{\alpha_i^{k-1}}{\log(\lambda^{k-1}) + \log(A_i^*)}.$$

The throughput between the site i and j is provided by the following relation $$r_{i,j} = \frac{1}{N}\left(C\frac{A_i^*}{\sum_i A_i^*}\right)^{-\frac{1}{\alpha_i}}.$$

The slice congestion cost is updated such as to optimize the slice capacity by the following $$\lambda^k = \lambda^{k-1} + \delta(\Sigma\Sigma A_{i,j}r_{i,j} - C),$$

where $\delta$ is the step for updating the congestion cost or slice usage. This updating step may be either fixed or adaptive. For the fixed step case, the same step is maintained for all the congestion cost update while in adaptive step one may reduce the step $\delta$ when the rate of the increase of the slice congestion cost is high.

In this regard, the multi-site orchestration in this alternative embodiment according to the present invention contains the following steps:

1. The multi-site orchestrator initiates an orchestration with the parameter $\alpha_i=1$, i.e. training sequences and a schedule is used to identify the orchestration model $\{A_{i,j}\}$. The dominant routing for each site is obtained from the measured throughputs of the communications between the different sites. The initial congestion cost is set to C and the sites are not communicating.

2. Initial congestion cost is obtained from the measured throughput for the different sites at the multisite orchestrator.

3. The multi-site orchestrator selects the set of sites with maximum routing value $A_i^*$ and each site set its demand $\alpha_i^k$ the relation above and determine the throughput between the sites i and j by the relation provided above.

4. The orchestrator updates the congestion costs with the relation above.

5. Local choreography updates the estimation of $\{A_{i,j}\}$ and go to step (2).

In summary, the present invention proposes a cognitive model based multi-site orchestration which contains the following features:

Monitoring the performance of the PLMN and build a multi-site orchestration model for the multi-site orchestration (service or radio orchestration);

Determining from the model the distributed orchestration or choreography opportunities between the sites and triggering choreography between the different sites;

Using the choreography to update the multi-site orchestration model.

Therefore, the present invention is its flexibility since its takes into account the partial information obtained from the PLMN and/or the cloud network. Therefore, the orchestration objective is optimized and the overall reduction of the orchestration complexity is reduced. In addition, the present invention also reduces the latency of the multi-site orchestration and the signalling overhead with the public network.

Moreover, is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

The invention claimed is:

1. A method for providing multi-site orchestration in a public network for factory automation, wherein the public network provides communication and computing functionality to a plurality of sites which are configured to communicate with each other by means of slice of the public network, the method comprising:

building a multi-site orchestration model based on initial performance of communication between different sites;
  determining choreography opportunities between the different sites by using the multi-site orchestration model;
  triggering choreography between the different sites; and
  evaluating performance of the choreography between the different sites and updating the multi-site orchestration model.

2. The method according to claim 1, wherein, before building the multi-site orchestration model, the method further comprises:

initiating an initial orchestration so as to identify a coarse initial model, based on which the multi-site orchestration model is built.

3. The method according to claim 2, wherein, the initial orchestration is a proportional faire orchestration, with which each site communicates with its neighboring sites with a same data packet bandwidth.

4. The method according to claim 1, wherein the multi-site orchestration model contains a representation of sites and of communication conditions between the sites.

5. The method according to claim 1, wherein the multi-site orchestration model includes a graph which contains nodes representing the sites and edges between any pair of nodes, the edges representing communication or processing capabilities between the nodes.

6. The method according to claim 1, wherein the multi-site orchestration model includes a model for demand of the sites expressed in terms of utility of the communication between the sites.

7. The method according to claim 1, wherein the multi-site orchestration model includes a model for congestion of the communication between the sites expressed in terms of congestion costs.

8. The method according to claim 1, wherein the multi-site orchestration model includes a site ranking that is based on specific flow transmission that is based on random walk of packets between the sites and a stochastic matrix.

9. The method according to claim 1, wherein the multi-site orchestration model includes a database of sites adapted to perform orchestration with relevant attributes.

10. The method according to claim 1, wherein initial performance of the public network is obtained by periodic monitoring of network state, throughput, packet errors, and/or delay.

11. The method according to claim 10, wherein the determining choreography opportunities between the different sites by using the multi-site orchestration model is processed based on error between predicted performance from the multi-site orchestration model and measured traffic performance or through topological criteria that are obtained from the multi-site orchestration model.

12. The method according to claim 1, wherein the triggering choreography between the different sites comprises setting up an edge cloud between the different sites participating to the choreography and starting to exchange information between the different sites.

13. The method according to claim 1, wherein the evaluating the performance of the choreography between the different sites and updating the multi-site orchestration model comprises monitoring the public network.

14. An apparatus for providing multi-site orchestration in a public network for factory automation, wherein the public network provides communication and computing functionality to a plurality of sites which are configured to communicate with each other by slice of the public network, the apparatus comprising:

a processor to execute a program; and
  a memory to store the program which, when executed by the processor, the processor performs processes of:
  building a multi-site orchestration model based on initial performance of the public network;
  determining choreography opportunities between different sites by using the multi-site orchestration model;
  triggering choreography between the different sites; and
  evaluating performance of the choreography between the different sites and update the multi-site orchestration model.

15. A communication system for factory automation, comprising the apparatus according to claim 14.

* * * * *